(12) United States Patent
Zank et al.

(10) Patent No.: US 7,876,930 B2
(45) Date of Patent: Jan. 25, 2011

(54) FINGERPRINT READER COMBINATION

(75) Inventors: Anthony Edward Zank, Simi Valley, CA (US); Bruce Odessky, Pasadena, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 983 days.

(21) Appl. No.: 11/619,128

(22) Filed: Jan. 2, 2007

(65) Prior Publication Data

US 2008/0159602 A1 Jul. 3, 2008

(51) Int. Cl.
*G06K 9/00* (2006.01)
(52) U.S. Cl. ............... 382/116; 382/124; 382/314; 235/440; 235/462.45
(58) Field of Classification Search ........... 235/380, 235/385, 440, 449, 462.3, 472.01, 379, 381, 235/383, 451, 462.45; 382/116, 124, 314; 705/18; 713/182, 185, 186
See application file for complete search history.

(56) References Cited

U.S. PATENT DOCUMENTS

| | | | |
|---|---|---|---|
| D307,134 S | | 4/1990 | Makidera |
| 5,103,486 A | * | 4/1992 | Grippi .................. 382/116 |
| 5,546,471 A | | 8/1996 | Merjanian |
| 5,920,642 A | | 7/1999 | Merjanian |
| D424,533 S | | 5/2000 | Kandalepas |
| 6,193,152 B1 | * | 2/2001 | Fernando et al. ............ 235/380 |
| D443,614 S | | 6/2001 | Do et al. |
| 6,272,562 B1 | * | 8/2001 | Scott et al. .................. 710/16 |
| D451,509 S | | 12/2001 | Liston et al. |
| 6,327,376 B1 | | 12/2001 | Harkin |
| D470,170 S | | 2/2003 | Cheng |
| 6,941,001 B1 | | 9/2005 | Bolle et al. |
| 7,039,813 B2 | * | 5/2006 | Algazi et al. ................ 713/186 |
| 7,229,013 B2 | * | 6/2007 | Ben-Aissa ................... 235/380 |
| 7,311,258 B2 | * | 12/2007 | Trippe et al. ............ 235/462.13 |
| 7,748,620 B2 | * | 7/2010 | Gomez et al. ............... 235/383 |
| 2002/0138351 A1 | * | 9/2002 | Houvener et al. ............. 705/18 |
| 2005/0074147 A1 | | 4/2005 | Smith et al. |
| 2005/0139668 A1 | * | 6/2005 | Trippe et al. ................ 235/440 |
| 2007/0069030 A1 | * | 3/2007 | Sauerwein et al. ..... 235/462.46 |
| 2007/0071291 A1 | * | 3/2007 | Yumoto et al. .............. 382/124 |
| 2008/0159602 A1 | * | 7/2008 | Zank et al. .................. 382/124 |

* cited by examiner

*Primary Examiner*—Gregory M Desire
(74) *Attorney, Agent, or Firm*—Denton L. Anderson; Sheldon Mak & Anderson PC

(57) ABSTRACT

The combination of an electronic fingerprint reader and a second electronic transmission device includes a first portion with a top surface and an electronic transmission device disposed therein and a second portion having a top surface with a width between about 2 inches and about 12 inches and a depth between about 1 inch and about 12 inches. A fingerprint reader is disposed in the top surface of the second portion. The top surface of the second portion is disposed at an angle of between about 0° and about 30° with respect to the horizontal such that the top surface of the second portion slants forwardly from the trailing edge of the second portion towards the leading edge of the second portion. The leading edge of the second portion is disposed at an elevation between about 0 inches and about 4 inches above the trailing edge of the first portion. The second electronic transmission device can be an electronic signature pad, a display screen, a keypad, a card reader, a mag-stripe reader or other electronic transmission devices.

10 Claims, 21 Drawing Sheets

FINGERPRINT READER COMBINATION

FIELD OF THE INVENTION

This invention relates generally to electronic fingerprint readers and combinations of fingerprint readers, signature pads, digital displays, keypads, etc. into a single entity.

BACKGROUND OF THE INVENTION

Banks and retail establishments are increasingly moving towards the use of fingerprint reading devices. A fingerprint reading device has an electronic screen against which a customer is asked to place his or her thumb or other finger. The electronic screen automatically picks up the customer's fingerprint and relays it to a center location for authentication or recording.

Additionally, banks and retail establishments are showing increased interest in the use of other electronic transmission devices such as electronic signature pads, display screens, keypads, card readers and mag-strike readers.

Electronic signature pads are of a special interest. An electronic signature pad has an electronic screen or a sheet of paper disposed over an electronic screen. The customer is asked to sign his or her signature on the screen or on a sheet of paper which overlays the screen. The screen automatically picks up the customer's signature and relays it to a central location for authentication or storage.

Banking and retail establishments often find it cumbersome to use both a fingerprint reader and a second electronic transmission device, because the use of the two separate devices frequently takes up an undue amount of precious counter space.

There have been attempts to incorporate a fingerprint reader device with a second electronic transmission device. However, such attempts have not been wholly successful. One problem with such combined devices is that it is very awkward to use. Especially the fingerprint reader is difficult to access and frequency requires the rotation of the entire unit.

Accordingly, there is a need for a combined fingerprint reader and second electronic transmission device which avoids these problems with the prior art.

SUMMARY

The invention satisfies this need. The invention is a combination of an electronic fingerprint reader and a second electronic transmission device comprising (a) a first portion having a leading edge, a trailing edge, a width and a depth, the first portion further comprising a top surface with the second electronic transmission device disposed therein; and (b) a second portion having a leading edge, a trailing edge, a width and a depth, the leading edge of the second portion being attached proximate to the trailing edge of the first portion, the second portion further comprising a top surface with a width of between about 2 inches and about 12 inches and a depth between about 1 inch and about 12 inches and a fingerprint reader disposed therein, the leading edge of the second portion being disposed at an elevation of between about 0 inches and about 4 inches above that the trailing edge of the first portion.

DRAWINGS

These and other features, aspects and advantages of the present invention will become better understood with reference to the following description, appended claims and accompanying drawings where:

DETAILED DESCRIPTION

Figure 1:
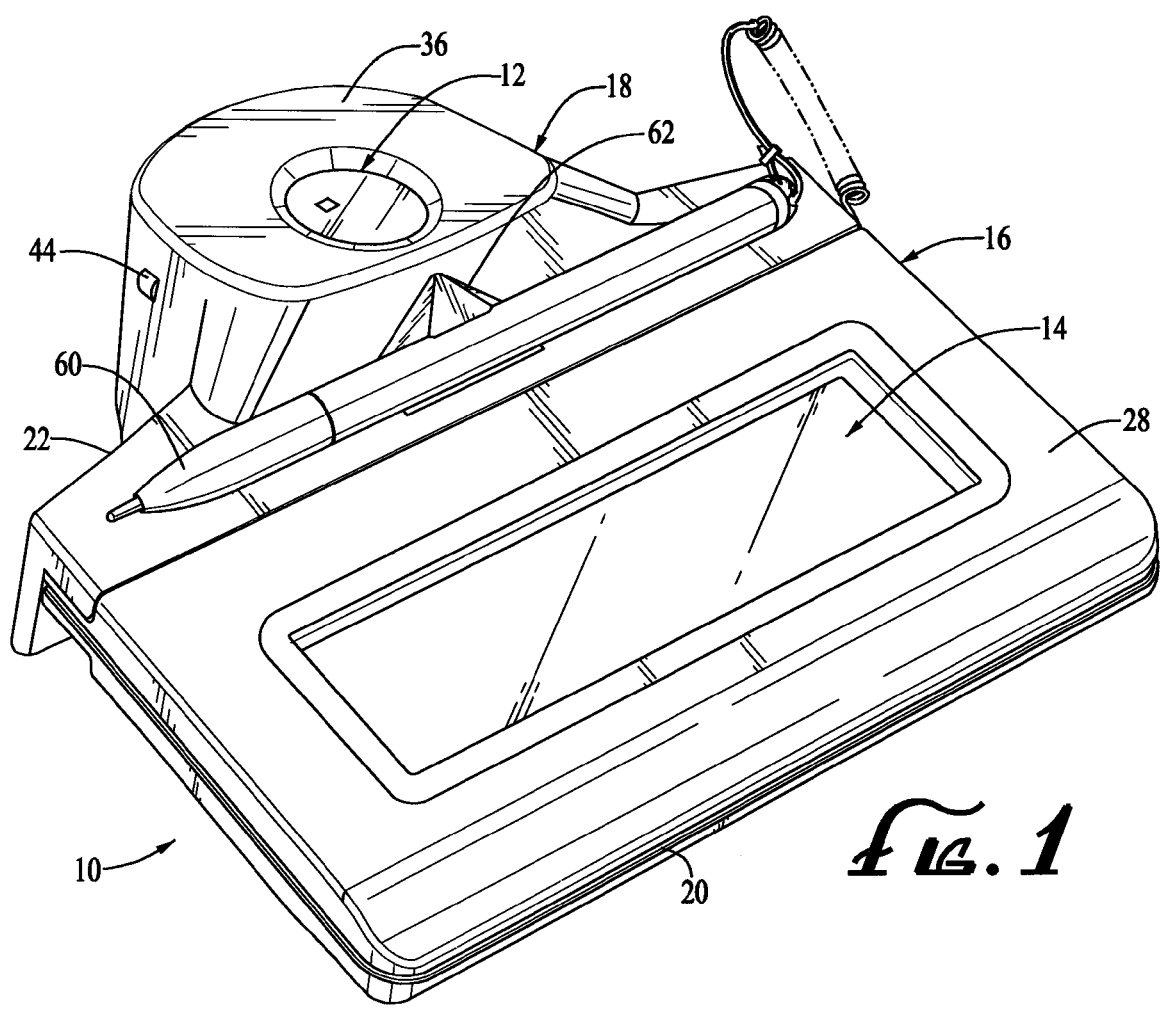
FIG. 1 is a perspective view of a first signature pad and fingerprint reader combination having features of the invention.
Figure 2:
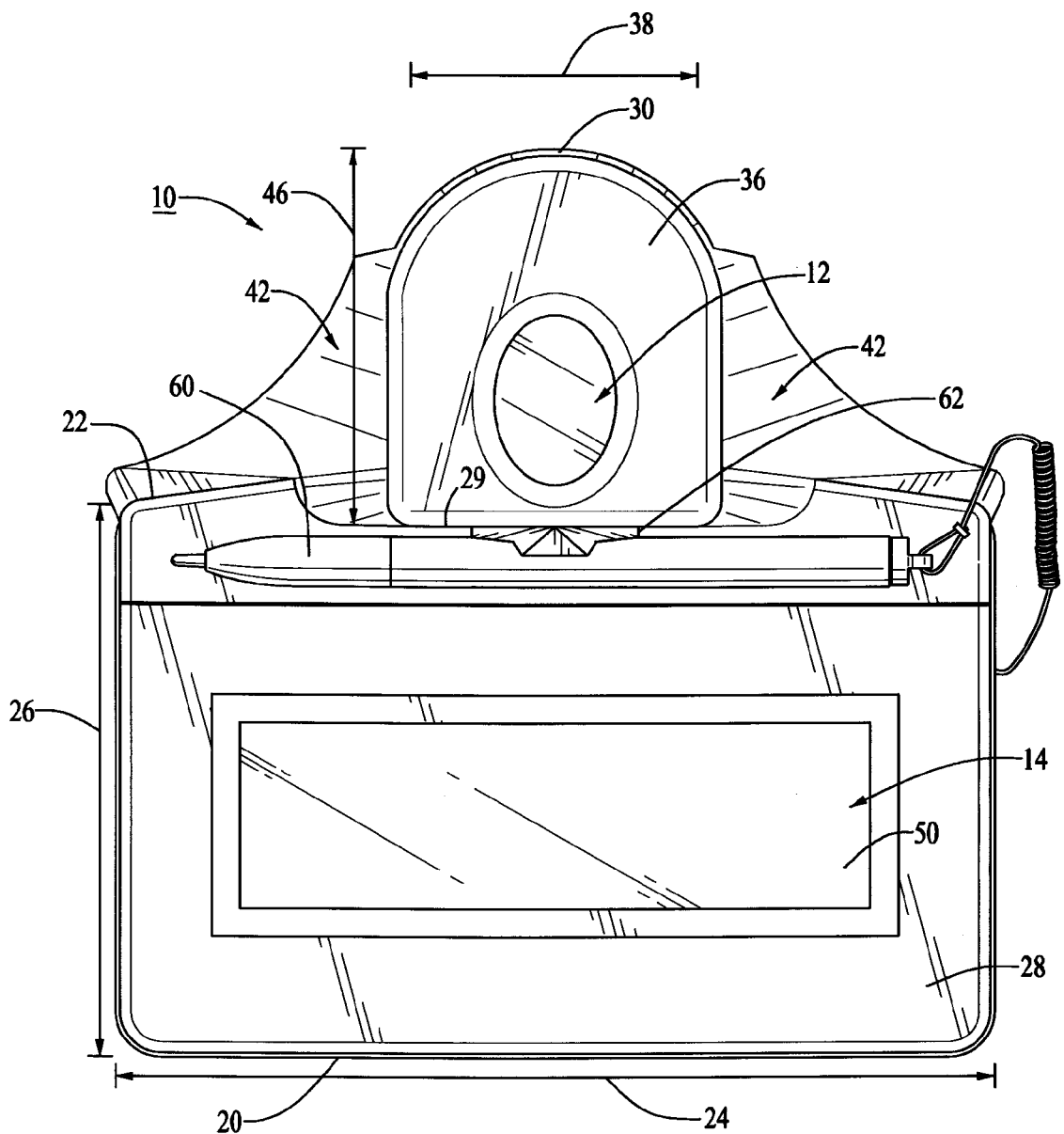
FIG. 2 is a plane view of the signature pad and fingerprint reader combination illustrated in FIG. 1.
Figure 3:
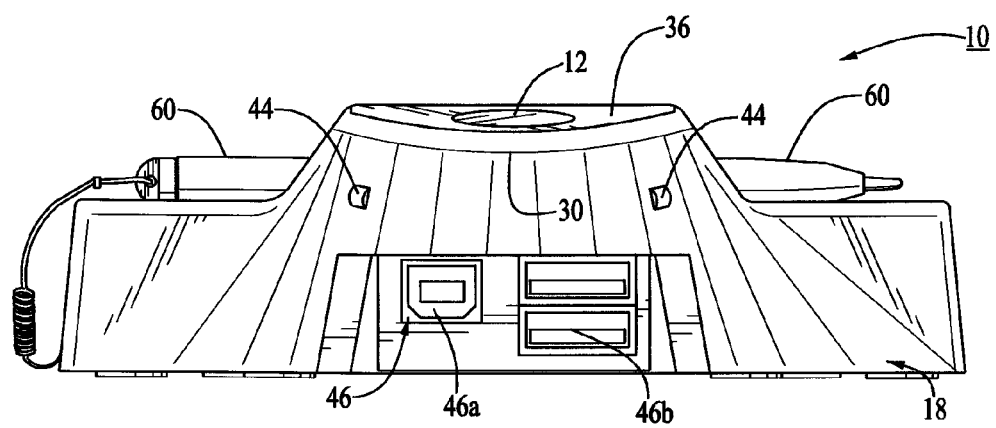
FIG. 3 is a rear view of the signature pad and fingerprint reader combination illustrated in FIG. 1.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a combination 10 of an electronic fingerprint reader 12 and a second electronic transmission device 14.

FIGS. 1-4 illustrate a first embodiment of the combination 10. The combination 10 comprises a first portion 16 and a second portion 18. The first portion has a leading edge 20, a trailing edge 22, a width 24 and a depth 26. The first portion also comprises a top surface 28 with the second electronic transmission device 14 disposed therein.

The second portion 14 has a leading edge 29, a trailing edge 30. The leading edge 29 of the second portion 18 is attached proximate to the trailing edge 22 of the first portion 16 as illustrated in the drawings.

The second portion 18 further comprises a top surface 36 with a width 38 of between about 1 inch and about 8 inches and has a depth 40 of between about 1 inch and about 6 inches. The fingerprint reader 12 is disposed in the top surface 36 of the second portion 18.

Figure 4:
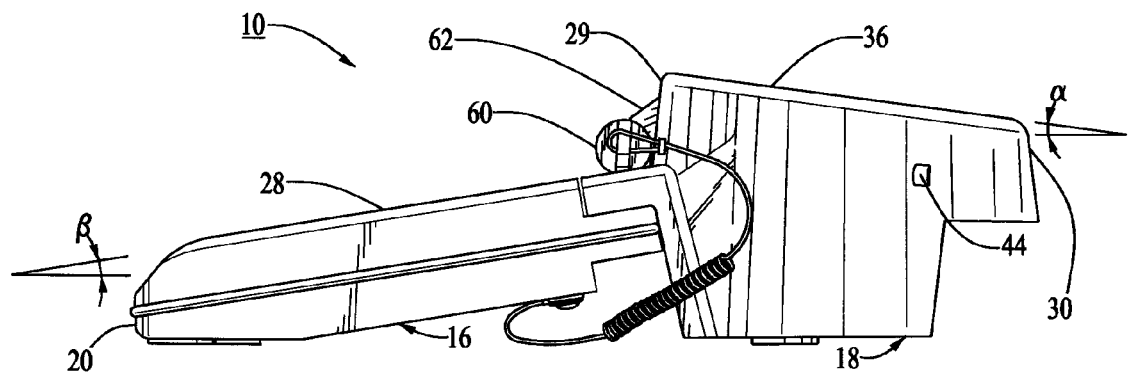
FIG. 4 is a side view of the signature pad and fingerprint reader combination illustrated in FIG. 1.

As illustrated in FIG. 4, the top surface 36 of the second portion 18 is disposed at an angle α of between about −10° and about +45° with respect to the horizontal. Preferably, the second portion 18 is disposed at an angle α of between about 1° and about +45° with respect to the horizontal, such that the top surface 36 of the second portion 18 slants forwardly from the trailing edge 30 of the second portion 18 towards the leading edge 29 of the second portion 18.

The leading edge 29 of the second portion 18 is disposed at an elevation of between about 0 inches and about 4 inches above the trailing edge 22 of the first portion 16, preferably between about ¼ inch and about 4 inches above the trailing edge 22 of the first portion 16.

Because of the above-described configuration of the first and second portions, 16 and 18, respectively, the combination 10 makes it simpler and more ergonometric to scan all eight fingers and two thumbs from in front of the first portion 16 by creating clearance for a person's hand or fist above the first portion 16, when scanning a fingerprint or thumb print.

The configuration necessarily defines void areas 42 to the left and to the right of the upper surface 36 of the second portion 18 so as to provide additional space to place a hand or fist to scan a thumb print naturally. In each case, the thumb print can be placed on the fingerprint reader either 90° clockwise or counterclockwise from a direct-in position.

In the event that the thumb print is scanned from the sides as described above, proximity sensors 44 (touch, proximity or optical in keeping with techniques well known in the art) can be disposed on the left and right sides of the fingerprint reader 12 to detect the presence of a hand and to determine which side of the second portion 18 the hand is coming from, and automatically rotate the fingerprint image accordingly, to be sure it is always in the proper orientation.

In the embodiment illustrated in FIGS. 1-4, the combination 10 further comprises one or more data ports 46 for receiving and transmitting data which can be located in the second portion 18. In the embodiments illustrated in the drawings, two such ports 46 are illustrated, a universal serial bus Type B female connector port 46a and two universal serial bus A female connector ports 46b.

Figure 5:
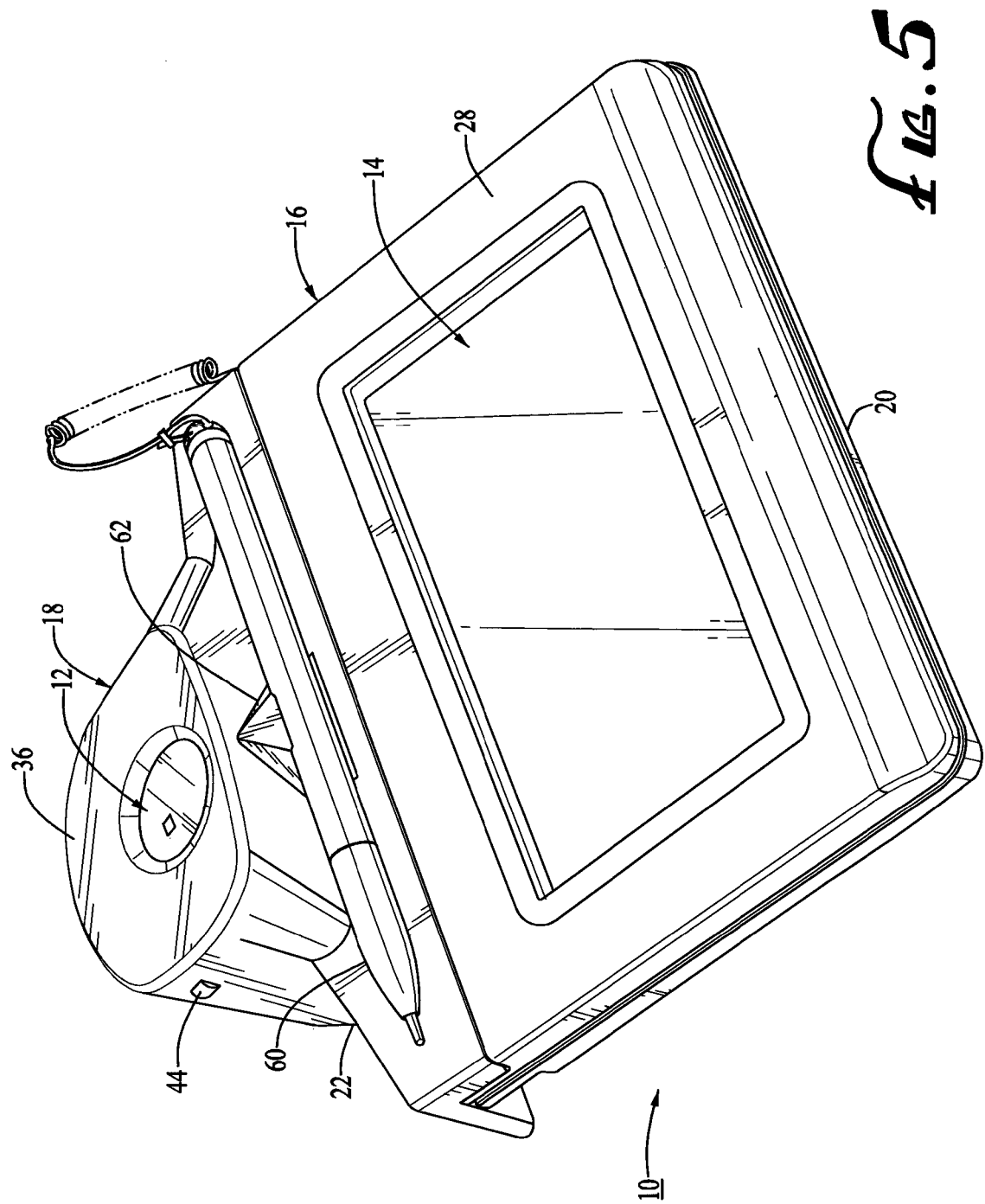
FIG. 5 is a perspective view of a second signature pad and fingerprint reader combination having features of the invention.
Figure 6:
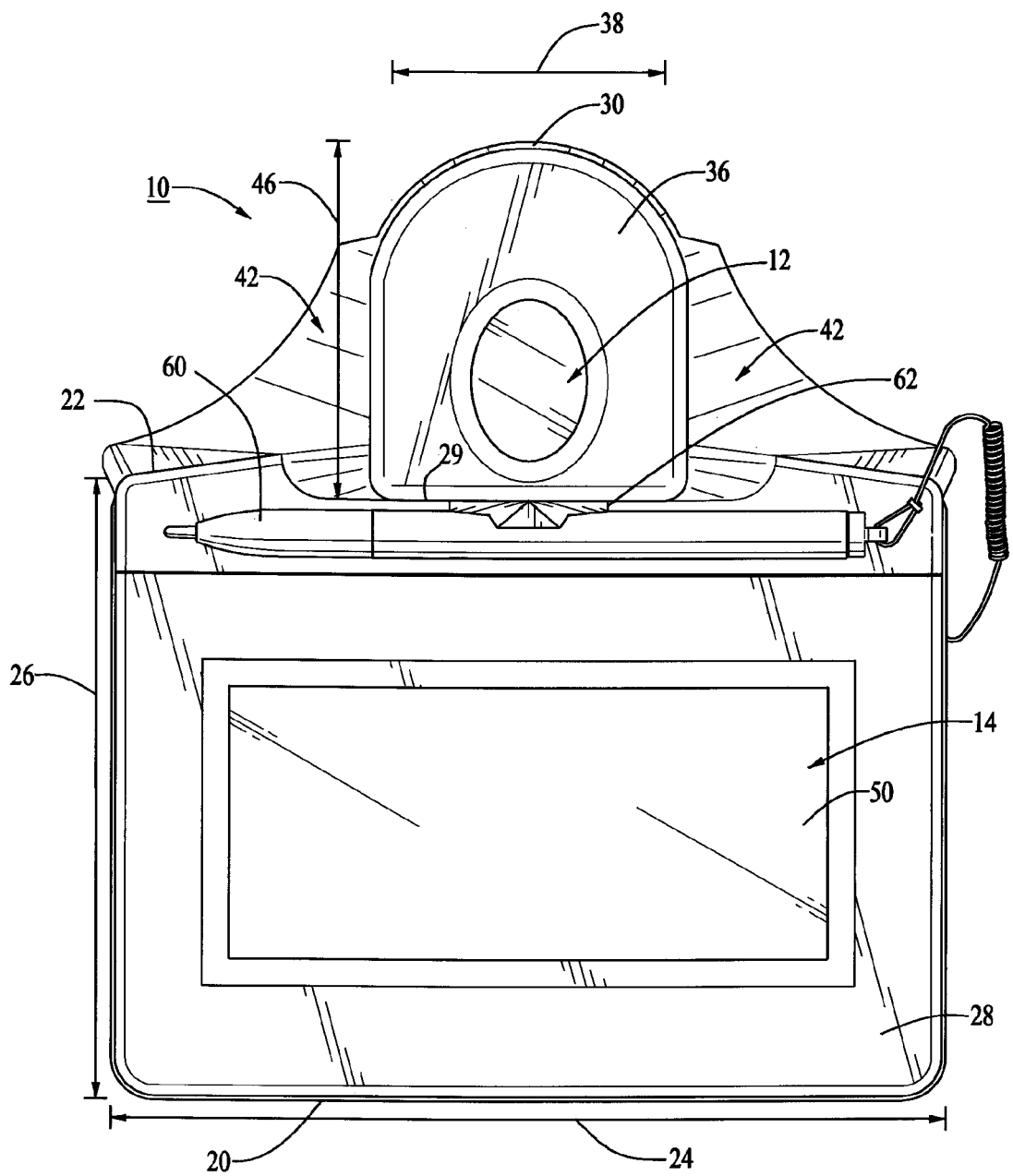
FIG. 6 is a plane view of the signature pad and fingerprint reader combination illustrated in FIG. 5.
Figure 7:
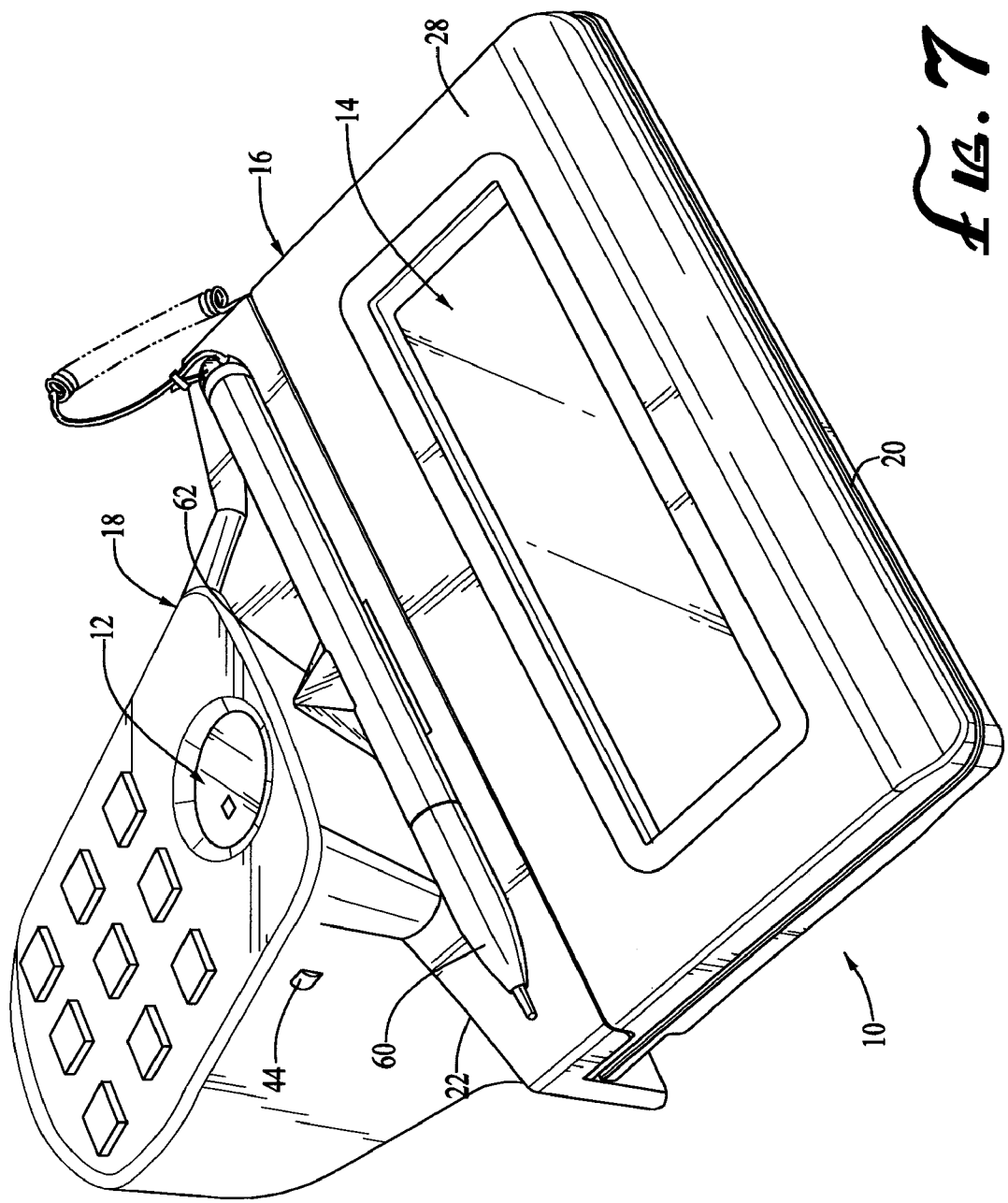
FIG. 7 is a perspective view of a third signature pad and fingerprint reader combination having features of the invention.
Figure 8:
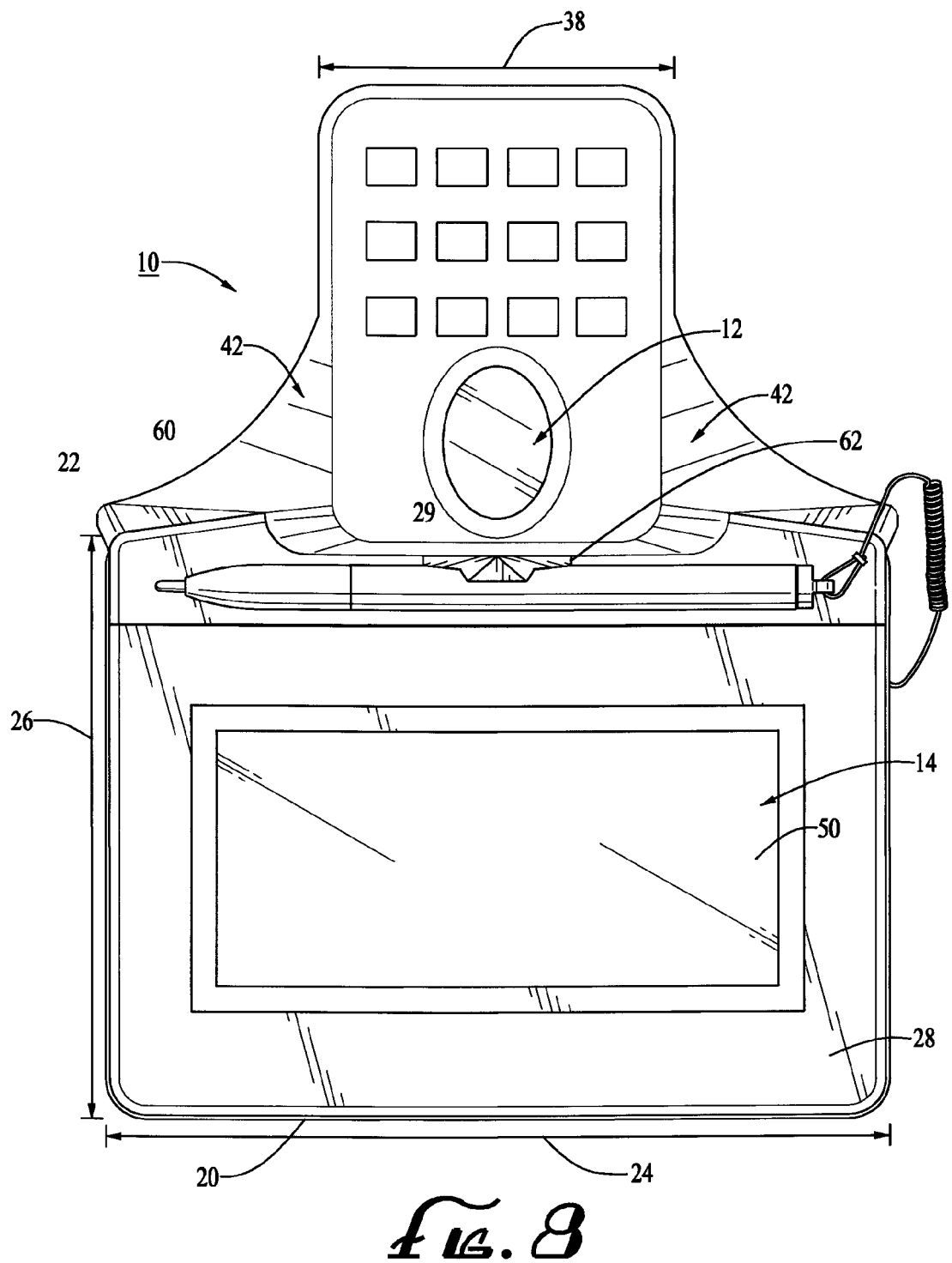
FIG. 8 is a plane view of the signature pad and fingerprint reader combination illustrated in FIG. 7.
Figure 9:
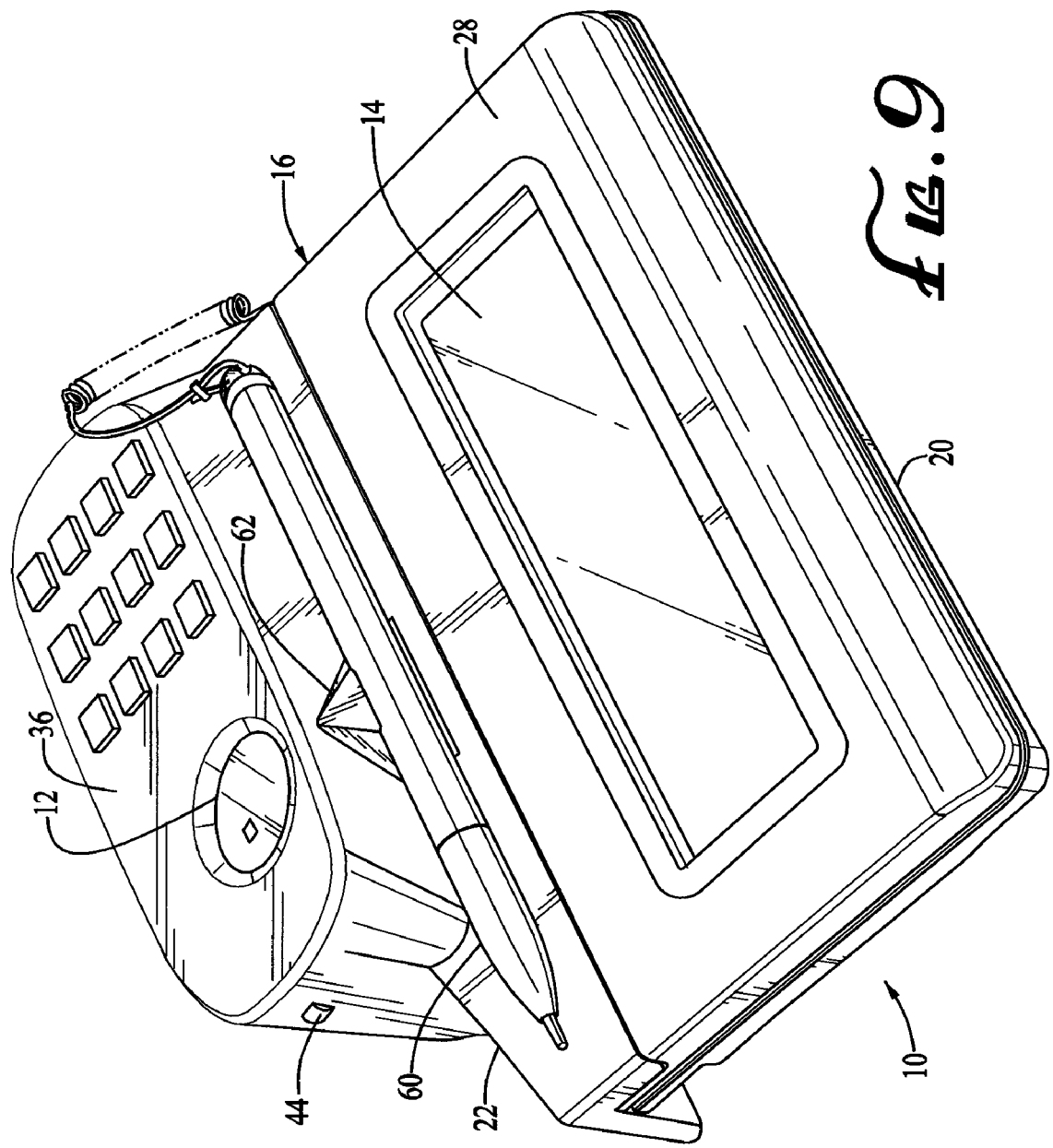
FIG. 9 is a perspective view of a fourth signature pad and fingerprint reader combination having features of the invention.
Figure 10:
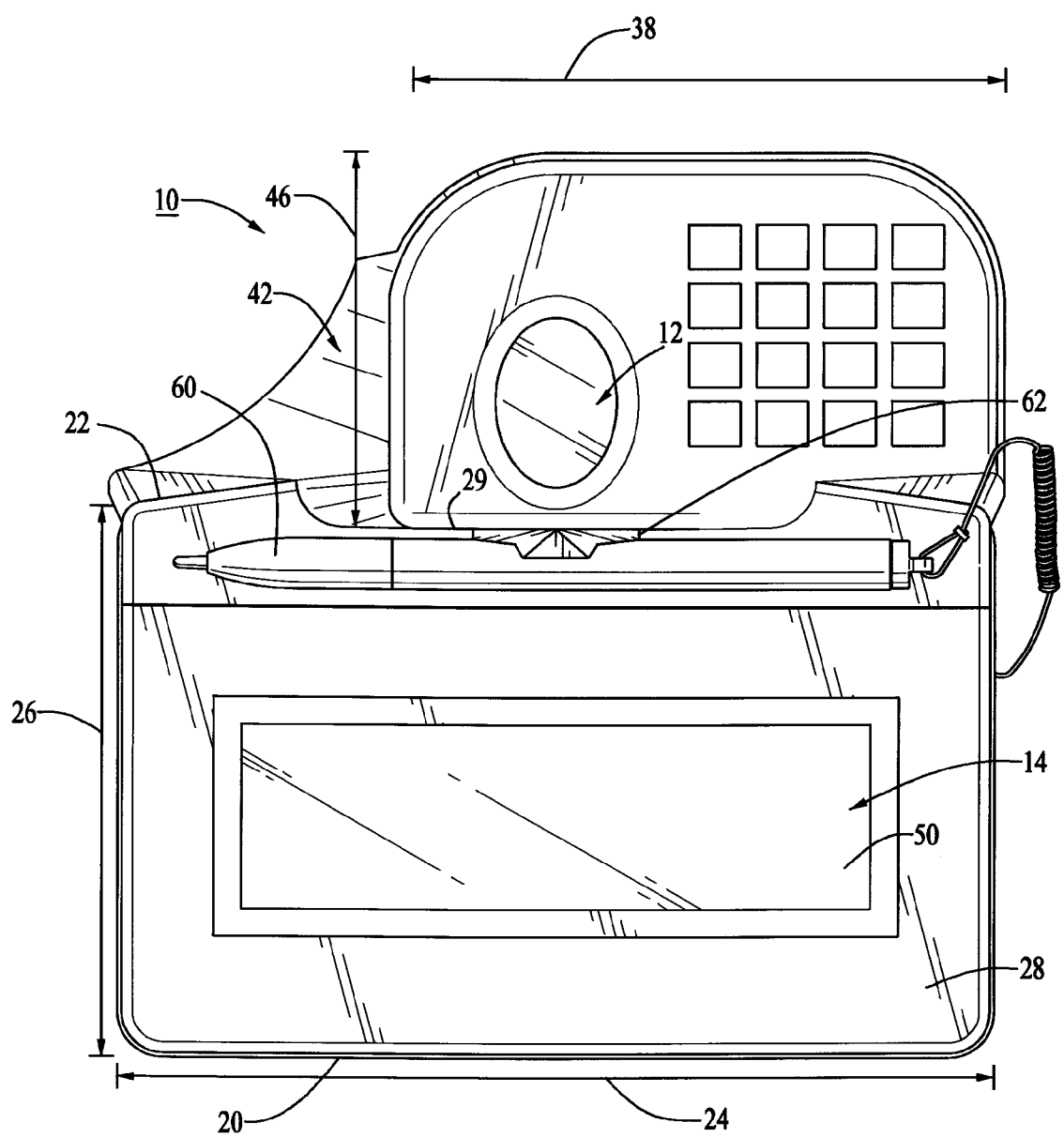
FIG. 10 is a plane view of the signature pad and fingerprint reader combination illustrated in FIG. 9.
Figure 11:
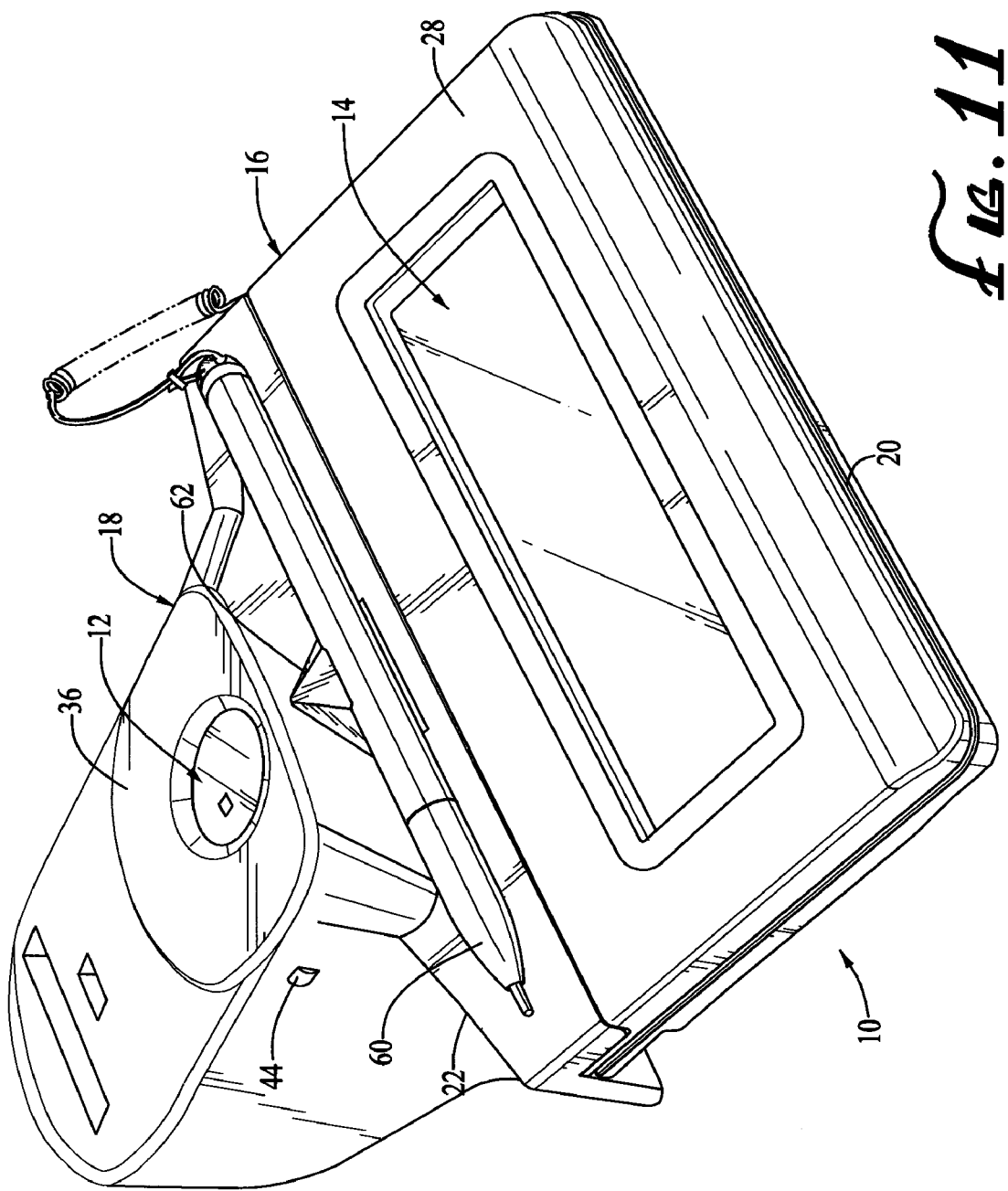
FIG. 11 is a perspective view of a fifth signature pad and fingerprint reader combination having features of the invention.
Figure 12:
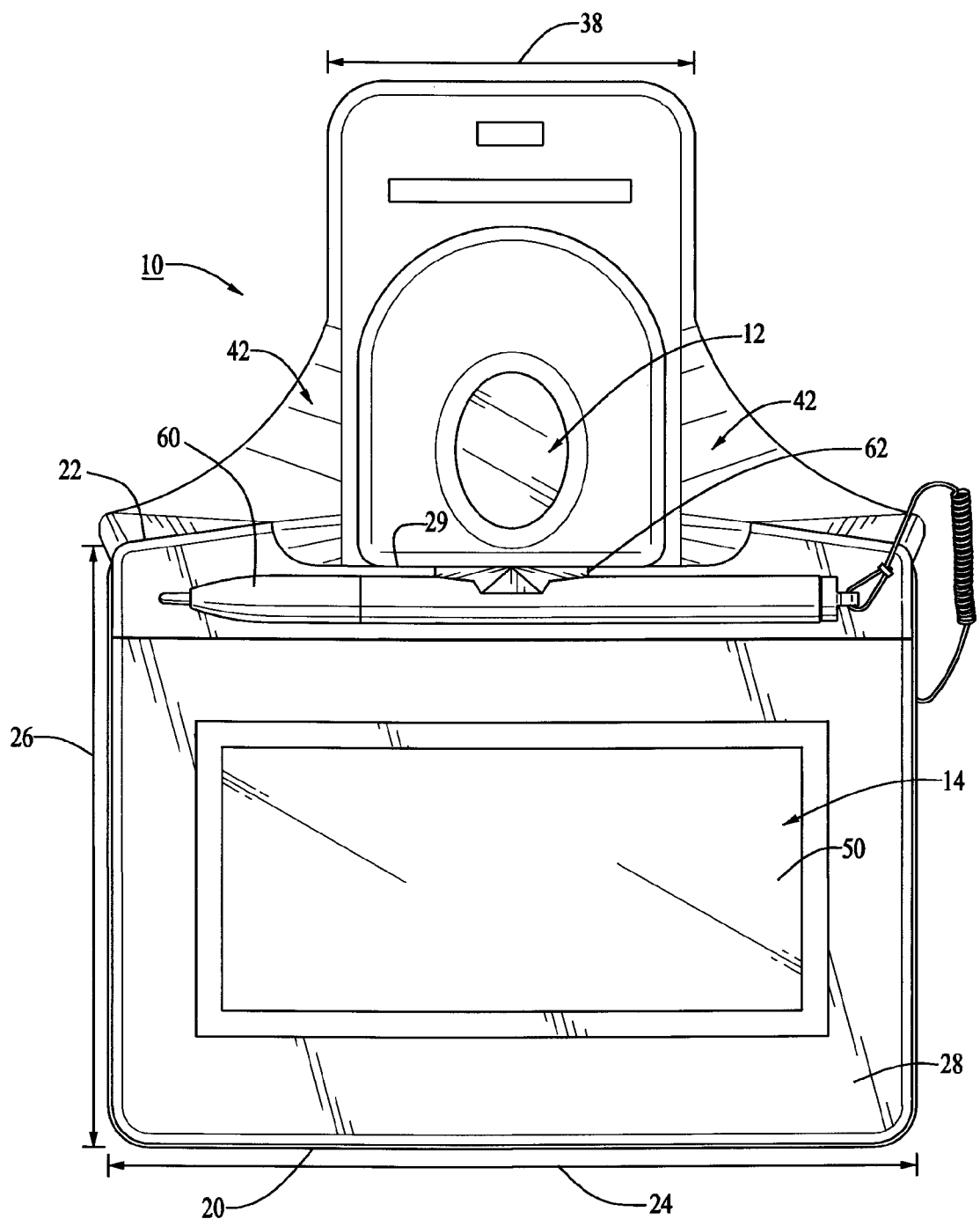
FIG. 12 is a plane view of the signature pad and fingerprint reader combination illustrated in FIG. 11.
Figure 13:
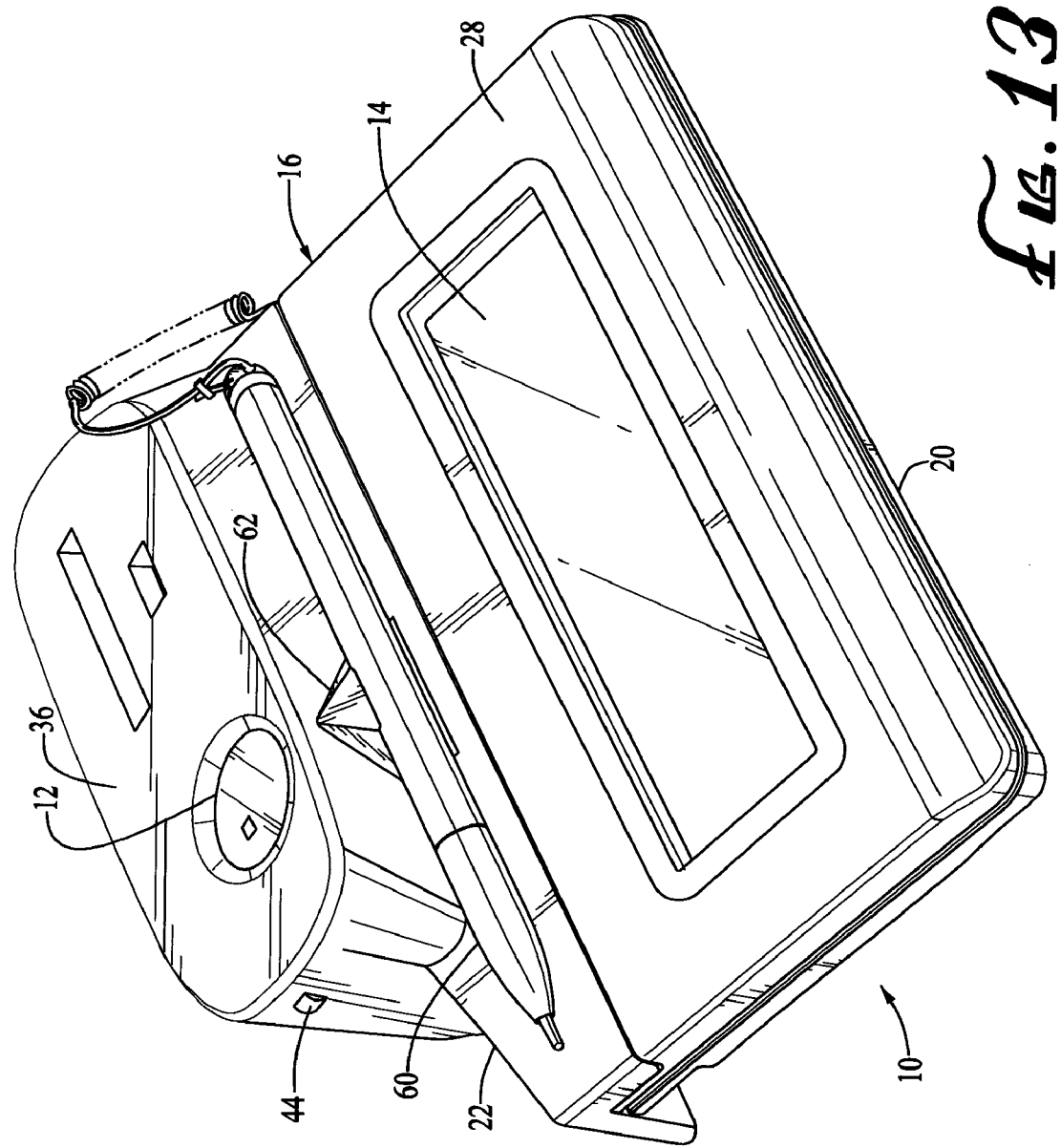
FIG. 13 is a perspective view of a sixth signature pad and fingerprint reader combination having features of the invention.
Figure 14:
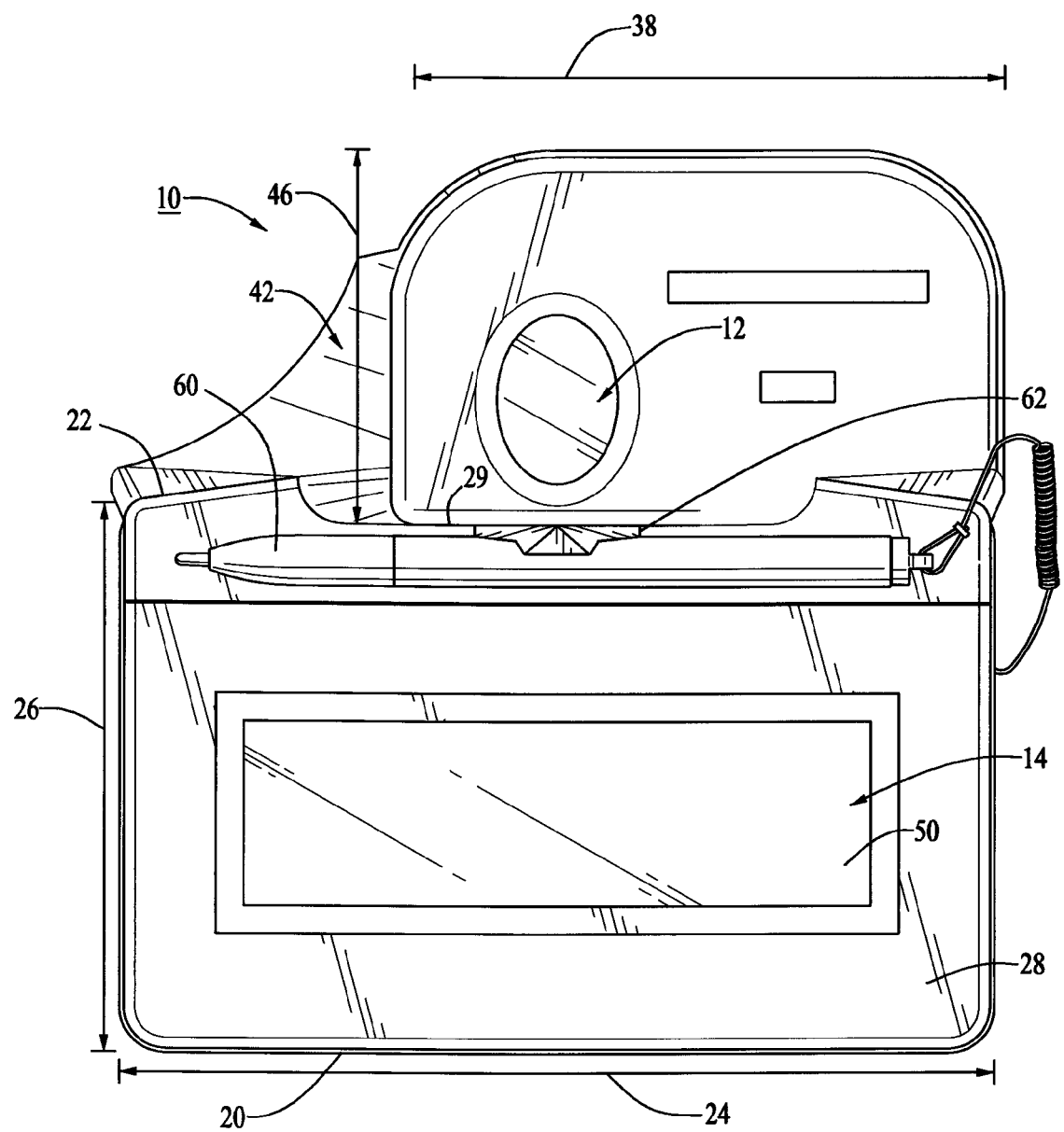
FIG. 14 is a plane view of the signature pad and fingerprint reader combination illustrated in FIG. 13.
Figure 15:
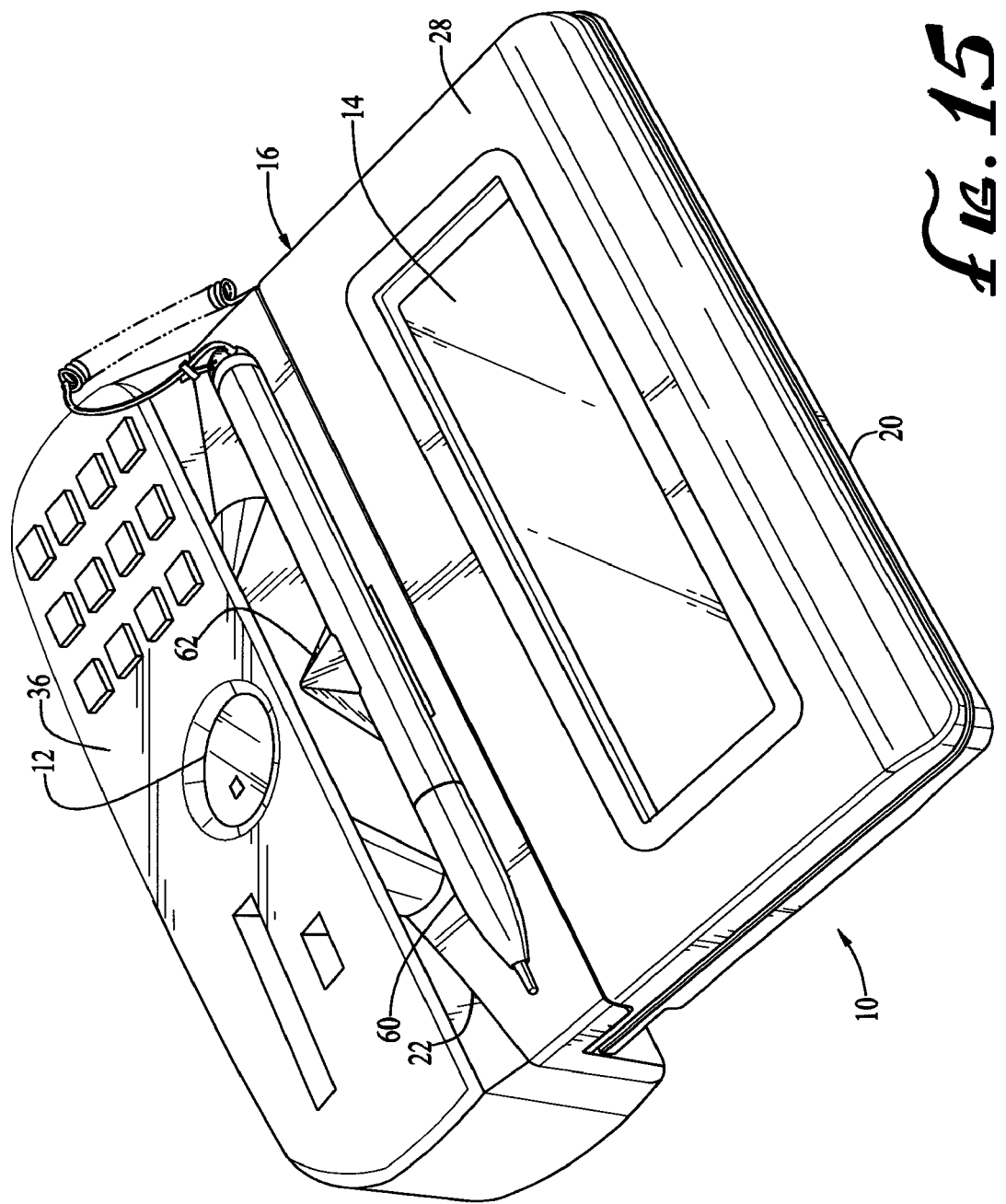
FIG. 15 is a perspective view of a seventh signature pad and fingerprint reader combination having features of the invention.
Figure 16:
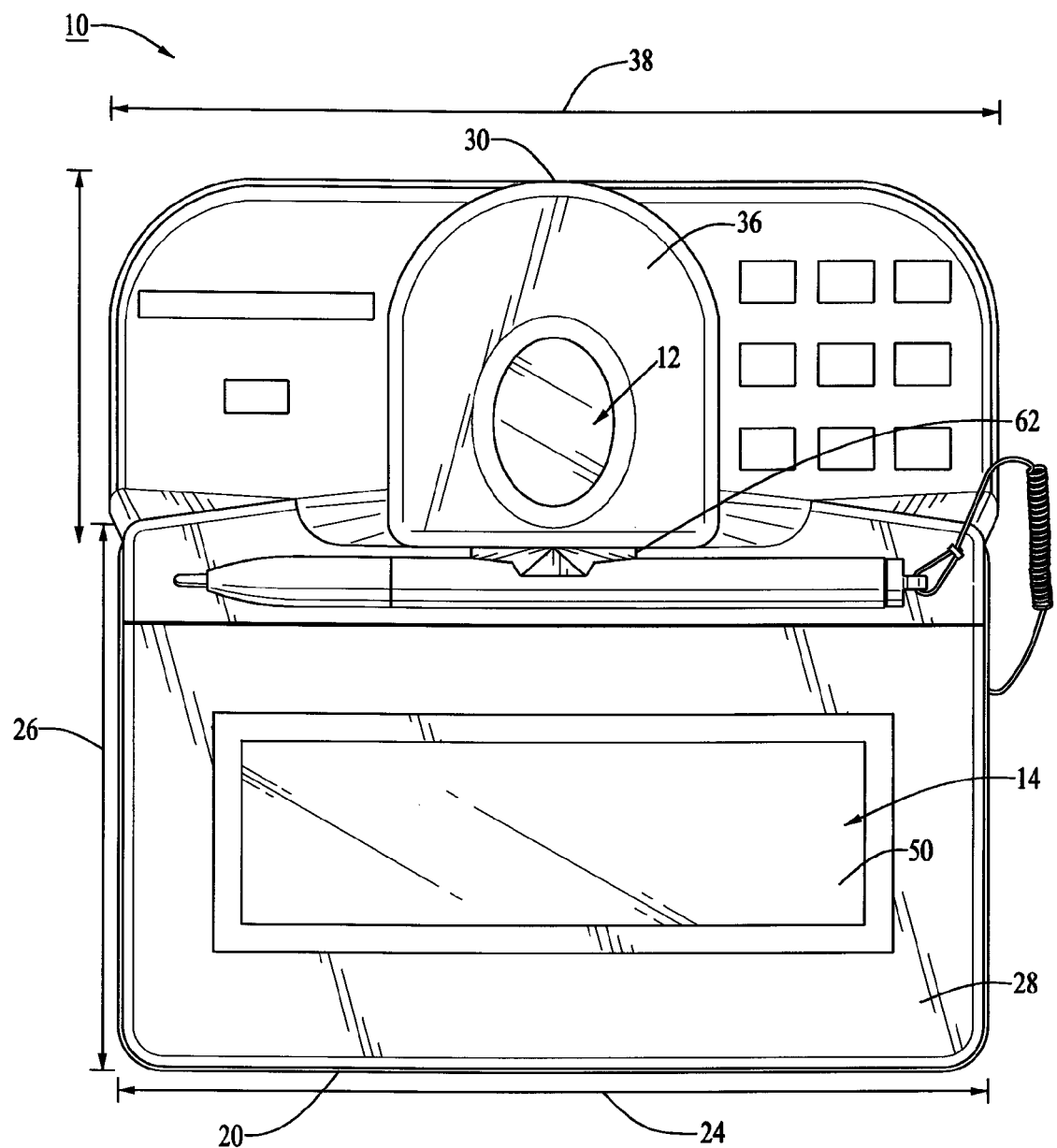
FIG. 16 is a plane view of the signature pad and fingerprint reader combination illustrated in FIG. 15.
Figure 17:
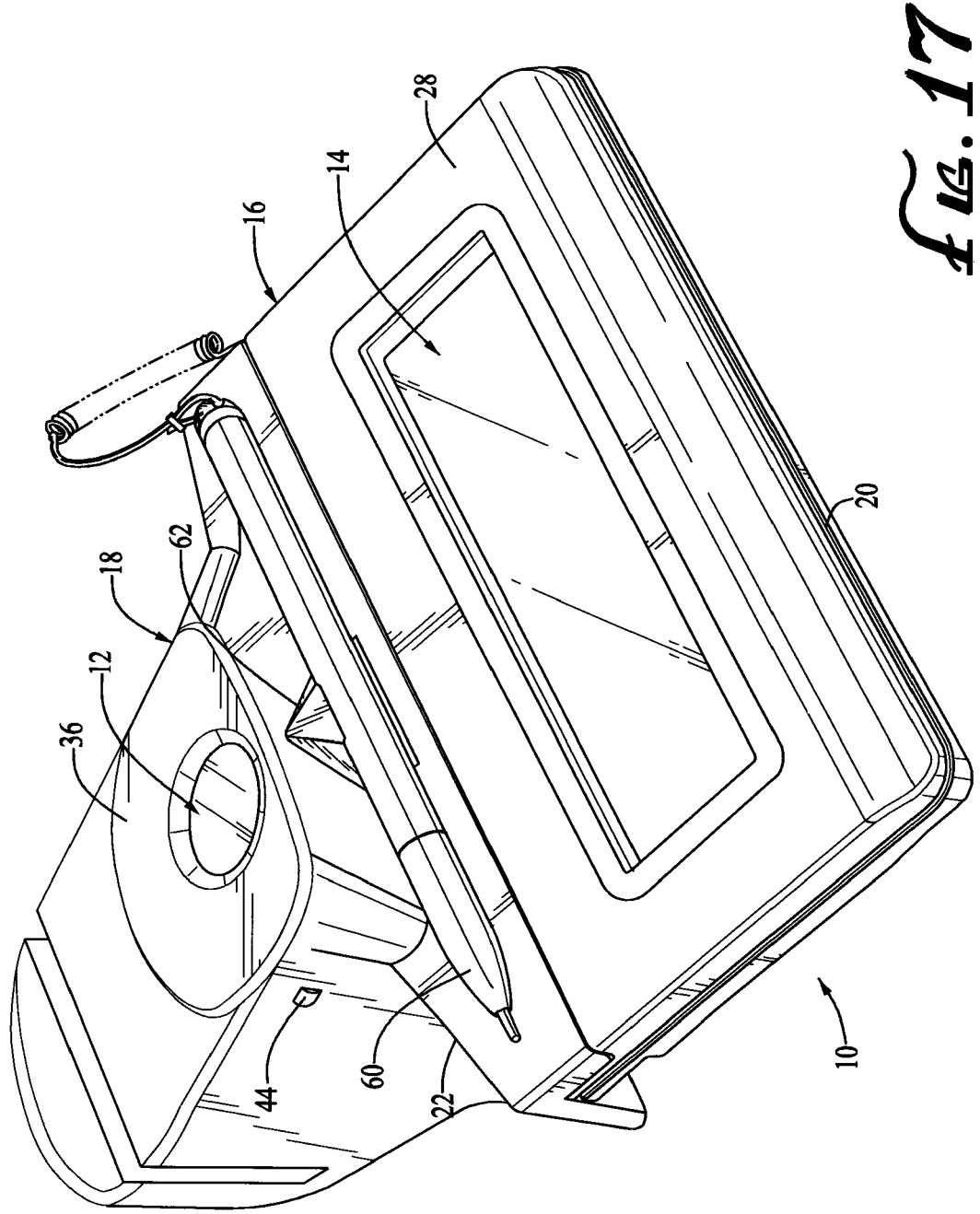
FIG. 17 is a perspective view of an eighth signature pad and fingerprint reader combination having features of the invention.
Figure 18:
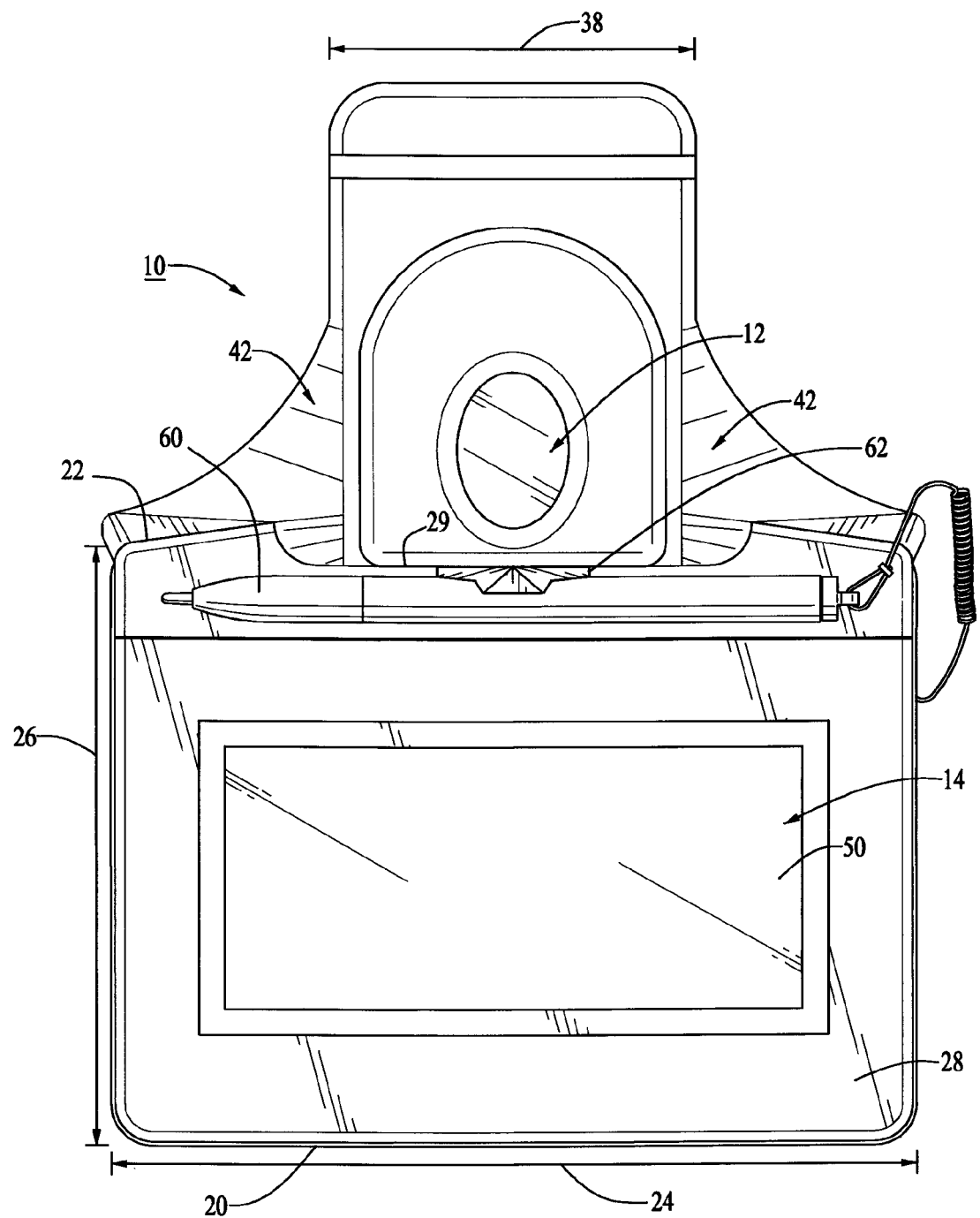
FIG. 18 is a plane view of the signature pad and fingerprint reader combination illustrated in FIG. 17.
Figure 19:
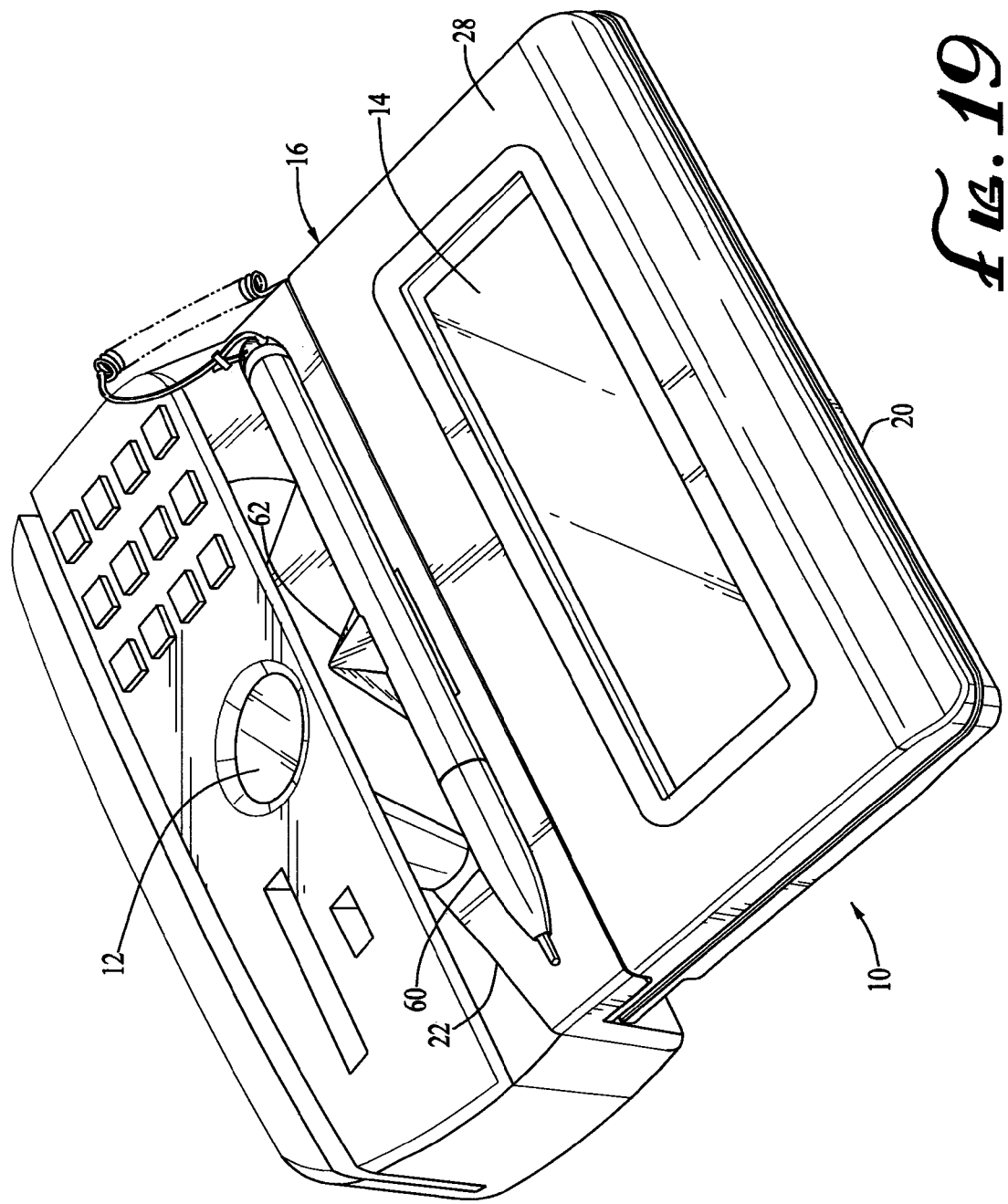
FIG. 19 is a perspective view of a ninth signature pad and fingerprint reader combination having features of the invention.
Figure 20:
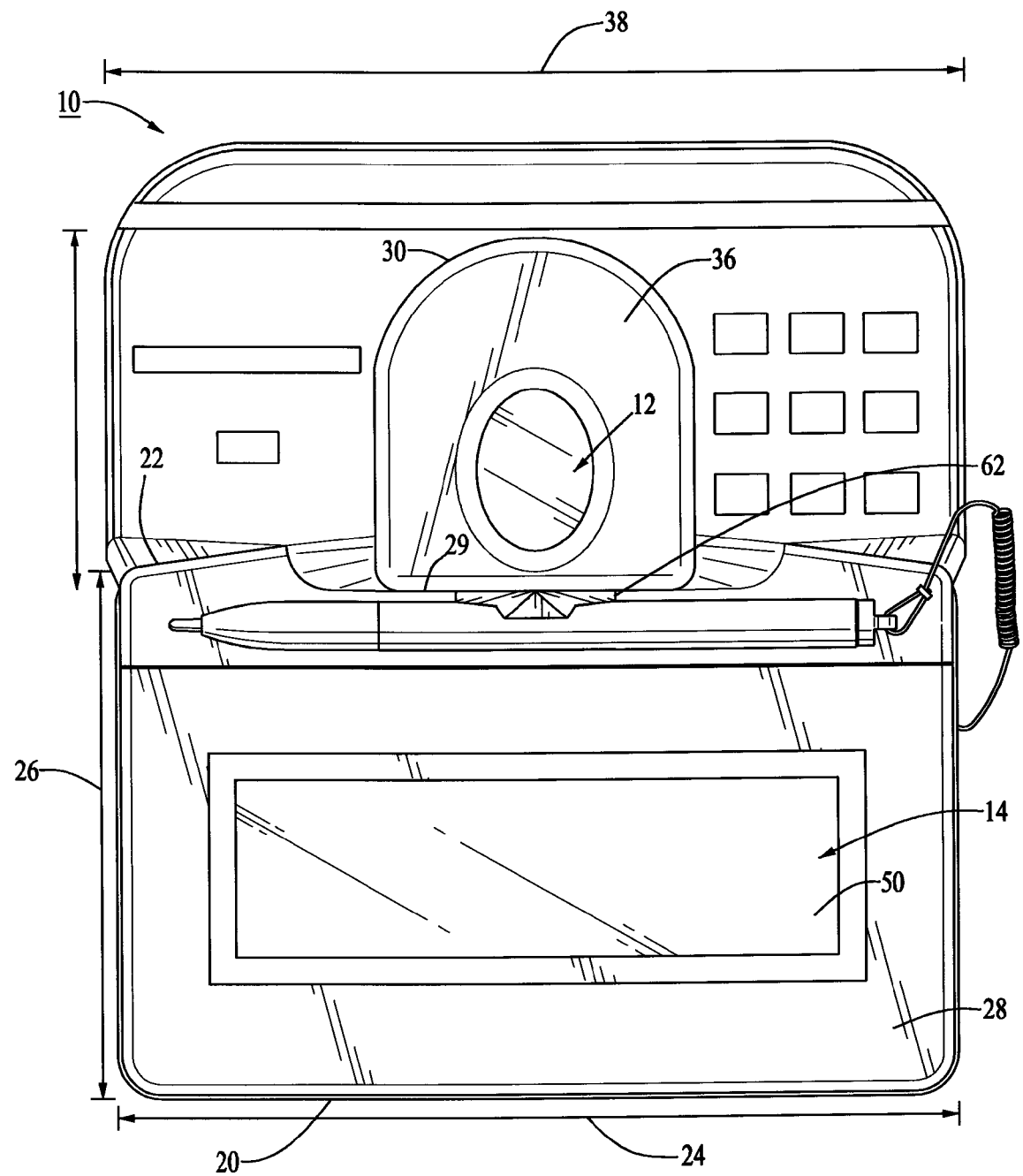
FIG. 20 is a plane view of the signature pad and fingerprint reader combination illustrated in FIG. 19.
Figure 21:
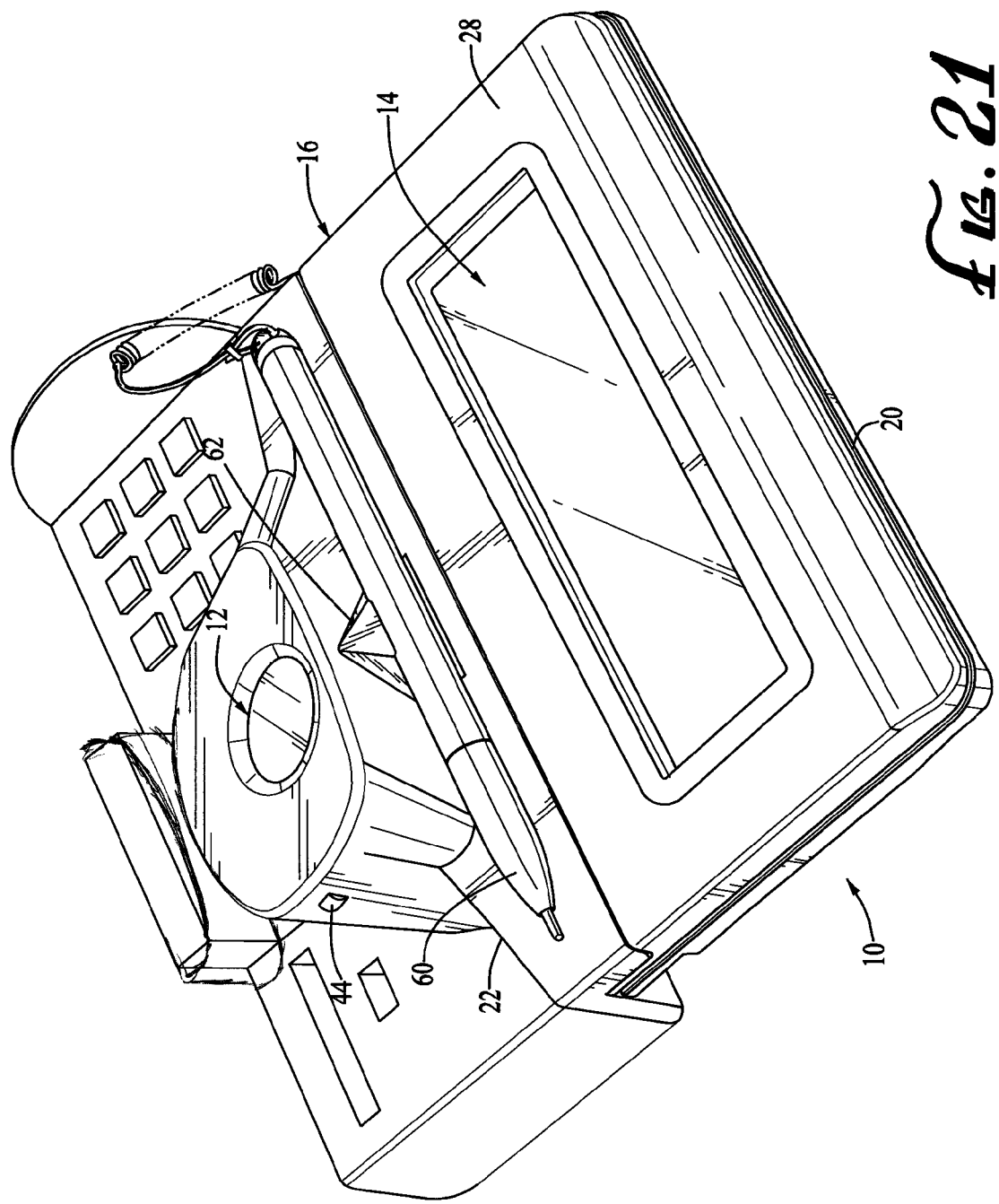
FIG. 21 is a perspective view of a tenth signature pad and fingerprint reader combination having features of the invention.
Figure 22:
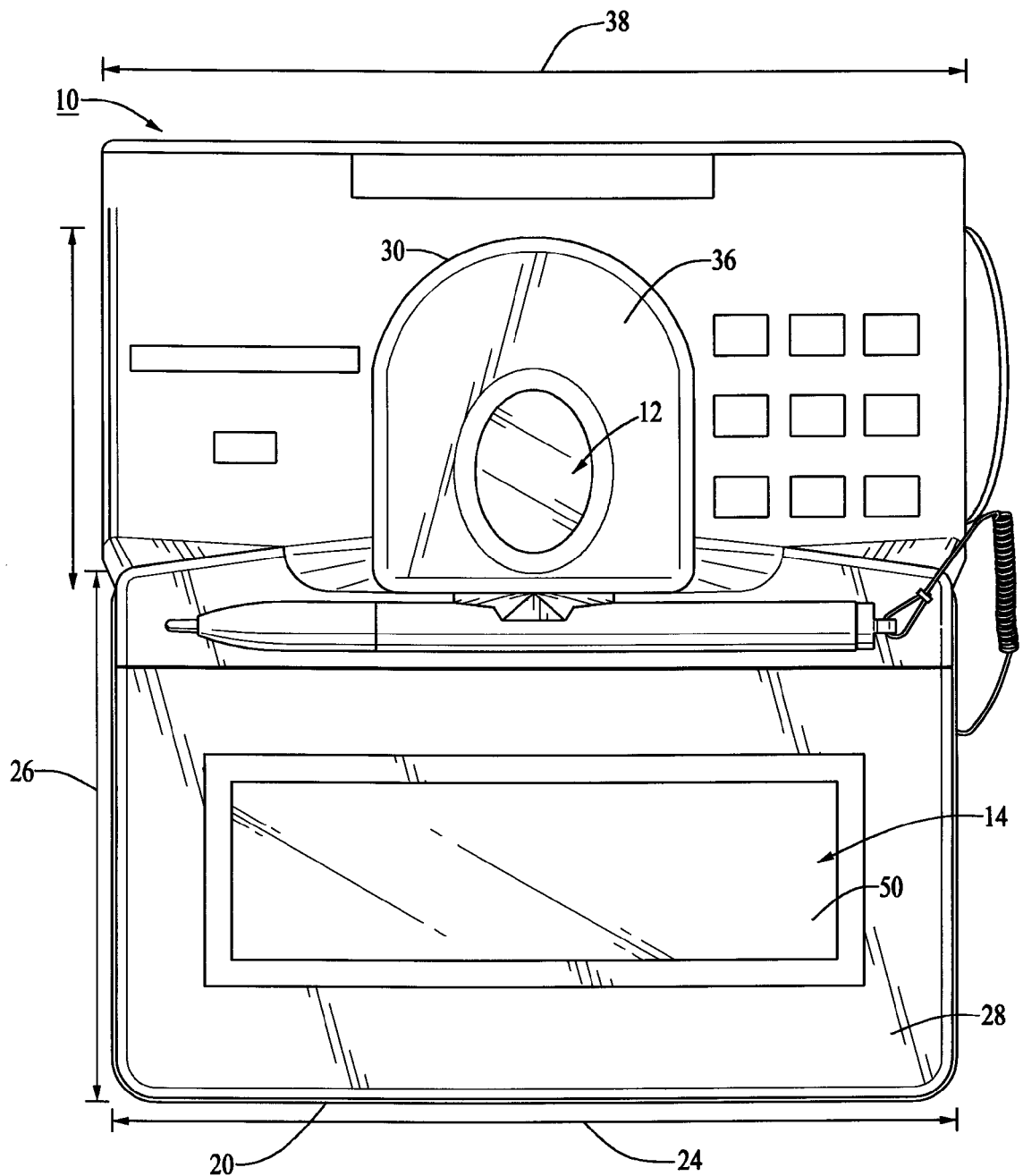
FIG. 22 is a plane view of the signature pad and fingerprint reader combination illustrated in FIG. 21.

The second electronic transmission device 14 can be any of the electronic transmission devices 14 presently known in the art or developed in the future. This second electronic transmission device can, for example, be an electronic signature pad 50 (as illustrated in FIGS. 1-4), a display screen 52 (as illustrated in FIGS. 5 and 6), a keypad 54 (as illustrated in FIGS. 7-10, 15-16 and 19-22), a card reader 56 (as illustrated in FIGS. 11-16 and 19-20) or a mag-stripe reader 58 (as illustrated in FIGS. 17-20).

Where the second electronic transmission device 14 is an electronic signature pad 50, it is preferable that the top surface 28 of the first portion 16 is disposed at an angle β of between about 5° and about 45° with respect to the horizontal (as illustrated in FIG. 4), such that the top surface 28 of the first portion 16 slants upwardly from the leading edge 20 of the first portion 16 towards the trailing edge 22 of the first portion 16. Disposing the top surface 28 of the first portion 16 at an angle provides a comfortable surface on which the user of the electronic signature pad 50 can rest his or her hand while writing his or her signature.

In such embodiments, an attached stylus 60 is provided which can be conveniently retained within a stylus holder 62 defined within the top surface 28 of the first portion 16.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. The combination of an electronic fingerprint reader and a second electronic transmission device comprising:
   (a) a first portion having a leading edge, a trailing edge, a width and a depth, the first portion further comprising a top surface with the second electronic transmission device disposed therein; and
   (b) a second portion having a leading edge, a trailing edge, a width and a depth, the leading edge of the second portion being attached proximate to the trailing edge of the first portion, the second portion further comprising a top surface with a width of between about 2 inches and about 12 inches and a depth between about 1 inch and about 12 inches and a fingerprint reader disposed therein, the leading edge of the second portion being disposed at an elevation of between about 0 inches and about 4 inches above the elevation of the trailing edge of the first portion;
   wherein at least one proximity sensor is disposed on the second portion separate from the fingerprint reader to detect the presence of a hand proximate to the top surface of the second portion and to determine the orientation of that hand.

2. The combination of claim 1 wherein the top surface of the second portion is disposed at an angle between about 1° and about 30° with respect to the horizontal, such that the top surface of the second portion slants forwardly from the trailing edge of the second portion towards the leading edge of the second portion.

3. The combination of claim 1 wherein the configuration of the first portion and the second portion define void areas to the left and to the right of the upper surface of the second portion.

4. The combination of claim 1 wherein the second electronic transmission device is an electronic signature pad and wherein the top surface of the first portion is disposed at an angle of between about 5° and about 45° with respect to the horizontal, such that the top surface of the first portion slants upwardly from the leading edge of the first portion towards the trailing edge of the first portion.

5. The combination of claim 1 wherein the second electronic transmission device is a display screen.

6. The combination of claim 1 wherein the second electronic transmission device is a keypad.

7. The combination of claim 1 wherein the second electronic transmission device is a card reader.

8. The combination of claim 1 wherein the second electronic transmission device is a mag-stripe reader.

9. The combination of claim 1 wherein the second portion has a left side and a right side and wherein the at least one proximity sensor comprises a pair of proximity sensors, one disposed on the left side of the second portion and one disposed on the right side of the second portion.

10. The combination of claim 9 wherein, when the pair of proximity sensors detects the presence of a hand to determine which side of the second portion the hand is coming from, the fingerprint image is automatically rotated when necessary to dispose the fingerprint image in proper orientation.

* * * * *